United States Patent
Louis et al.

(10) Patent No.: US 12,215,192 B2
(45) Date of Patent: *Feb. 4, 2025

(54) POLY(ETHER KETONE KETONE) (PEKK) POLYMER AND COMPOSITES

(71) Applicants: SOLVAY SPECIALTY POLYMERS USA, LLC, Alpharetta, GA (US); Cytec Industries Inc., Princeton, NJ (US)

(72) Inventors: Chantal Louis, Alpharetta, GA (US); James Pratte, Wilmington, DE (US)

(73) Assignees: SOLVAY SPECIALTY POLYMERS USA, LLC, Alpharetta, GA (US); Cytec Industries Inc., Princeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/532,822

(22) Filed: Dec. 7, 2023

(65) Prior Publication Data

US 2024/0182637 A1  Jun. 6, 2024

Related U.S. Application Data

(63) Continuation of application No. 17/055,234, filed as application No. PCT/EP2019/066227 on Jun. 19, 2019, now Pat. No. 11,879,036.
(Continued)

(30) Foreign Application Priority Data

Jul. 17, 2018 (EP) ..................... 18184038
Jan. 22, 2019 (EP) ..................... 19153019

(51) Int. Cl.
C08G 65/40 (2006.01)
C08G 65/46 (2006.01)
(Continued)

(52) U.S. Cl.
CPC ..... *C08G 65/4012* (2013.01); *C08G 65/4093* (2013.01); *C08G 65/46* (2013.01);
(Continued)

(58) Field of Classification Search
CPC C08G 65/4056; C08G 2650/40; C08G 75/23; C08G 75/20; C08J 3/12;
(Continued)

(56) References Cited

U.S. PATENT DOCUMENTS

2006/0134419 A1* 6/2006 Monsheimer ......... B29C 64/153
528/125
2011/0201775 A1* 8/2011 Louis ................. C08G 65/4012
568/34

FOREIGN PATENT DOCUMENTS

GB          1250225    * 10/1971 ............. C08G 33/00

* cited by examiner

*Primary Examiner* — Shane Fang
(74) *Attorney, Agent, or Firm* — Osha Bergman Watanabe & Burton LLP

(57) ABSTRACT

The present invention relates to poly(ether ketone ketone) (PEKK) polymers, a method for the manufacture thereof, to articles and composites made therefrom, to methods of making the composites, and composite articles including the PEKK composites. It was surprisingly discovered that by synthesizing the PEKK polymers from low-metal monomers and selectively controlling the relative amounts of reactants during the synthesis, PEKK polymers having unexpectedly improved melt stability can be obtained. The PEKK composites including the PEKK polymers are especially well-suited for fabrication of thick composite parts where melt stability of the polymer matrix is important.

14 Claims, 1 Drawing Sheet

Related U.S. Application Data

(60) Provisional application No. 62/782,725, filed on Dec. 20, 2018, provisional application No. 62/688,047, filed on Jun. 21, 2018.

(51) Int. Cl.
*C08J 5/04* (2006.01)
*C08J 5/24* (2006.01)

(52) U.S. Cl.
CPC ............... *C08J 5/042* (2013.01); *C08J 5/043* (2013.01); *C08J 5/24* (2013.01); *C08G 2650/40* (2013.01); *C08J 2371/10* (2013.01)

(58) Field of Classification Search
CPC ...... C08J 2371/10; B33Y 70/00; B33Y 80/00; C08L 81/06
See application file for complete search history.

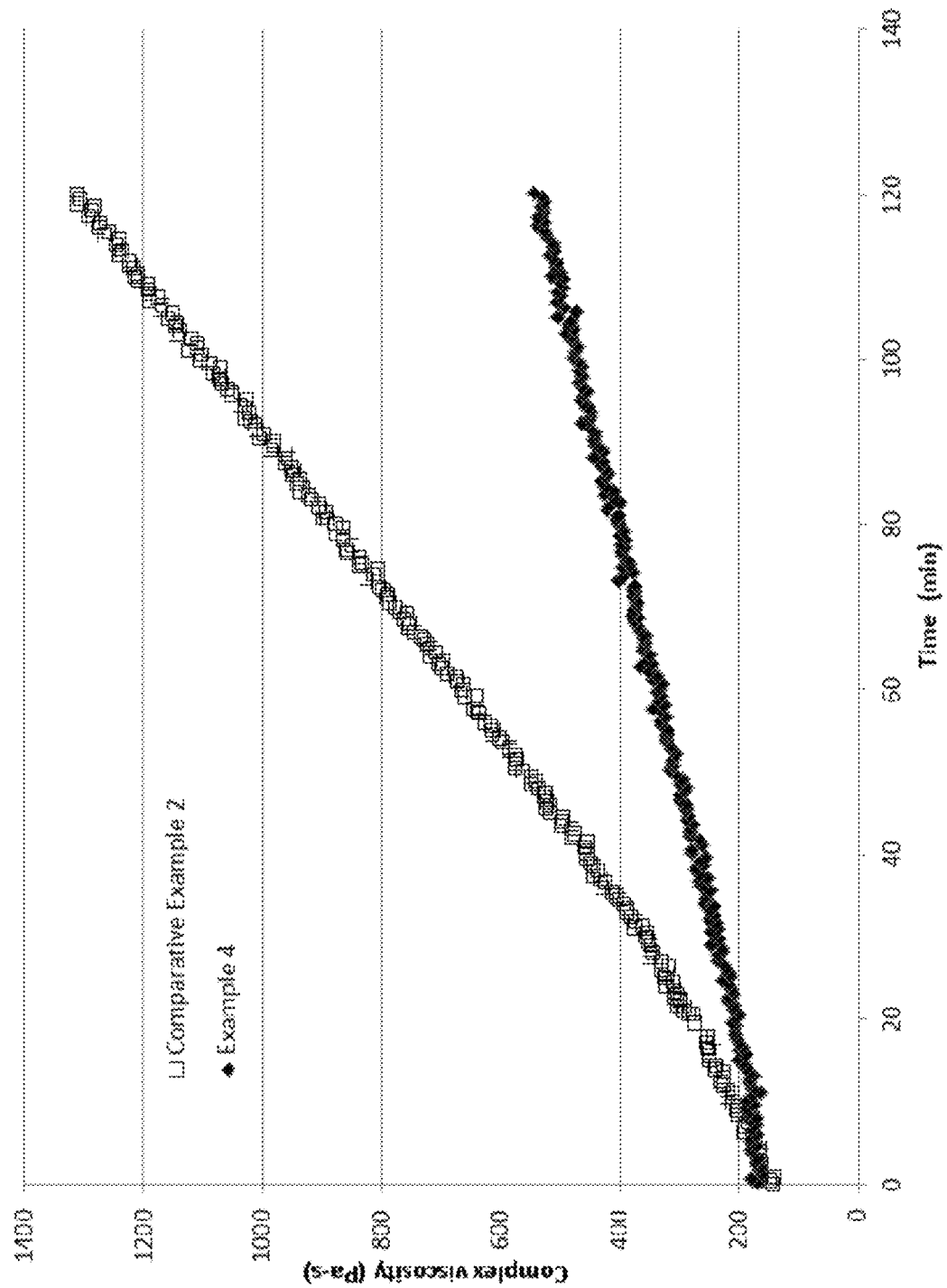

POLY(ETHER KETONE KETONE) (PEKK) POLYMER AND COMPOSITES

CROSS-REFERENCE TO RELATED APPLICATIONS

This application claims priorities to U.S. provisional application No. 62/688,047 filed on Jun. 21, 2018; European application No. EP 18184038.0 filed on Jul. 17, 2018; U.S. provisional application No. 62/782,725 filed on Dec. 20, 2018; European application No. EP 19153019.5 filed on Jan. 22, 2019; and U.S. application Ser. No. 17/055,234 filed on Nov. 13, 2020 which is a National Stage Entry of PCT/EP2019/066227 filed on Jun. 19, 2019, the whole content of each of these applications being incorporated herein by reference for all purposes.

TECHNICAL FIELD

The present invention relates to poly(ether ketone ketone) (PEKK) polymers, a method for the manufacture thereof, to articles and composites made therefrom, to methods of making the composites, and composite articles including the PEKK composites.

BACKGROUND ART

Poly(ether ketone ketone) polymers (hereinafter referred to as "PEKK polymers") are well suited for use in relatively extreme conditions. In part, due to the high crystallinity and high melt temperatures of PEKK polymers, they have excellent thermal, physical and mechanical properties, and are well-suited for use as a polymer matrix for continuous fiber reinforced composites. Such properties make PEKK polymers and composites thereof desirable in a wide range of demanding application settings, including, but not limited to, aerospace and oil and gas drilling.

Nevertheless, the same high crystallinity and high melt temperatures that provide many of the benefits of PEKK polymers also provide difficulties in the processing of such polymers. For example, WO 2018/115035 (Solvay Specialty Polymers U.S.A., LLC.) discloses that by selectively controlling the relative amounts of reactants during the synthesis, PEKK polymers having lower melt viscosities and hence improved processability can be obtained.

Also, it is not currently possible, without compromising toughness, to make thick PEKK composites (e.g. 60-ply or greater) without the use of large and expensive equipment such as an industrial-size autoclave to limit the exposure of the molten resin to long residence times at high temperatures. Composites can be fabricated, for example, with simpler, smaller scale, and more cost effective VBO (vacuum bag only) technology, where layers of composite are applied sequentially to form the final composite article; however, this technology requires a long residence time at elevated temperature levels as each new layer is fused to the previously-deposited layer. Areas of poor consolidation or degradation may result when thick PEKK composites are made in this way if the polymer matrix lacks sufficient melt stability.

SUMMARY OF INVENTION

The Applicant now found that not all the PEKK polymers obtained with the method disclosed in the International patent application WO 2018/115035 cited above shows a high crystallinity degree, which make the PEKK polymers useful for the manufacture of composites in admixture of with reinforcing fibers, such as glass fibers or carbon fibers.

In addition, the Applicant perceived that a need still exists for PEKK polymers having improved melt stability.

On another side, the Applicant perceived that a need exists for PEKK composites having improved melt stability and that are suitable for manufacture of thick composites using cost-effective technologies without compromising toughness.

Thus, the Applicant faced the problem of providing a PEKK polymer characterized by improved melt stability compared to PEKK polymers obtained from the methods already known in the art.

The Applicant surprisingly found that by using low-metal monomers and selectively controlling the relative amounts of reactants during synthesis, it is possible to make PEKK polymers having unexpectedly improved melt stability, as compared with PEKK polymers synthesized by conventional processes.

In addition, the Applicant surprisingly found that by controlling the amount of fluorine in the end groups of the PEKK polymers, it is possible to influence and hence control the melt stability of the PEKK polymer. The Applicant surprisingly found that a PEKK polymer having the desired amount of fluorine in its end groups can be prepared via a method comprising reacting a bis(halobenzoyl) benzene monomer with a bis(hydroxybenzoyl) benzene monomer such that their molar ratio is of 1.007:1 or higher.

Because of the unexpectedly increased melt stability of the PEKK polymers, PEKK composites including the PEKK polymers as described herein are especially well-suited for fabrication of thick composite articles (i.e. articles at least a portion of which is at least 4 mm thick). Furthermore, composite articles including the inventive PEKK composites can be manufactured using more cost-effective vacuum bag only ("VBO") technology.

Thus, in a first aspect, the present invention relates to a method [method $(M_S)$] of making a poly(ether ketone ketone) polymer [PEKK$_S$ polymer], said method comprising the following steps:

(I) in a reaction mixture, reacting at least one low-metal bis(hydroxybenzoyl) benzene monomer [monomer (HB)] and at least one low-metal bis(halobenzoyl) benzene monomer [monomer (FB)] in the presence of $Na_2CO_3$, $K_2CO_3$ and a solvent, wherein said monomer (FB) and said monomer (HB) are in a molar ratio of at least 1.007:1 wherein the relative amounts of the components reactants in step (I) are selected according the following Formulae:

$$\Sigma = (\% \ Na_2CO_3 - 105) + 6 \ast |\% \ K_2CO_3 - 1| + 0.25 \ast |37 - \% \ Monomers| - (\% \ XS_{DFDK}) \quad (EQ1)$$

and $$0\% \leq K_2CO_3 < 5 \text{ and} \quad (EQ2)$$

$$0.7\% < \% \ XS_{DFDK} \text{ and} \quad (EQ3)$$

$$25\% \leq Monomers \leq 44\% \text{ and} \quad (EQ4)$$

wherein
(a) $\Sigma < 6$
(b) % $Na_2CO_3$ is the concentration, in mol. %, of $Na_2CO_3$ relative to the number of moles of said monomer (HB);
(c) % $K_2CO_3$ is the concentration, in mol. %, of $K_2CO_3$ relative to the number of moles of said monomer (HB) and where % $K_2CO_3$ ranges from 0 mol. % to less than 5 mol. %;

(d) % Monomers is the total concentration, in wt. %, of said monomer (HB) and said monomer (FB), relative to the weight of said monomer (HB), of said monomer (FB) and solvent, and where % Monomers is from 25 wt. % to 44 wt. %; and
(e) % $XS_{DFDK}$ is the concentration, in mol. %, of said monomer (FB) in excess of an equimolar concentration of said monomer (HB);
said monomer (HB) and said monomer (FB) being independently represented by one of the following formulae:

$$X^5\text{-}M_m\text{-}X^5 \tag{13}$$

$$X^6\text{-}M_p\text{-}X^6 \tag{14}$$

wherein
$X^5$ and $X^6$ are —OH for said monomers (HB) and halogen, preferably Cl or F, more preferably F, for said monomers (FB), and
$M_m$ and $M_p$ are represented by the following formulae, respectively:

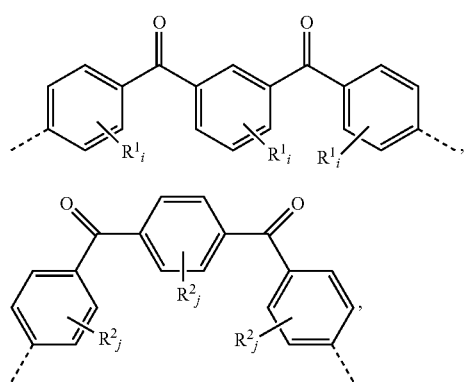

wherein
each of R1 and R2 is independently selected from the group consisting of alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
each of i and j is independently selected from 0 or an integer from 1 to 4;
to provide a mixture comprising at least one $PEKK_S$ polymer comprising
at least one recurring unit ($R^{M^*}_{PEKK}$) of general formula -[$M_m$-O—]-; and
at least one recurring unit ($R^{P^*}_{PEKK}$) of general formula -[$M_p$-O—]-;
wherein $M_m$ and $M_p$ are represented above formulae (3) and (4), respectively;
said $PEKK_S$ polymer being characterized by % [F]>45 $(\mu eq/g)/(g/10\ min)^{0.29}$, and T/I ratio greater than 61/39, more preferably of at least 65/35, most preferably at least 68/32, wherein
% [F] is the ratio between [F], i.e. the concentration of fluorine end groups in the PEKK polymer measured by 19F-NMR, and MFI, i.e. the melt flow index of the $PEKK_S$ polymer determined according to ASTM D1238 at 360° C. with a 8.4 Kg weight to the 0.29 power, and T/I ratio is the ratio between recurring units ($R^{P^*}_{PEKK}$) and recurring units ($R^{M^*}_{PEKK}$);
(II) contacting the mixture comprising at least one PEKK polymer obtained in step (I) with a solution containing sodium dihydrogen phosphate ($NaH_2PO_4$) and disodium hydrogen phosphate ($Na_2HPO_4$), to isolate said at least one $PEKK_S$ polymer.

Also, the Applicant faced the problem of providing a crystalline PEKK polymer, which can be used to provide composite materials in admixture with reinforcing fibers. Indeed, the Applicant found that pseudo-amorphous PEKK polymers, despite being obtained via controlled manufacturing process, are not suitable for final use in composite materials.

Thus, in a second aspect, the present invention relates to a poly(ether ketone ketone) polymer [$PEKK_S$ polymer] comprising
at least one recurring unit ($R^{M^*}_{PEKK}$) of general formula -[$M_m$-O—]-; and
at least one recurring unit ($R^{P^*}_{PEKK}$) of general formula -[$M_p$-O—]-;
wherein $M_m$ and $M_p$ are represented above formulae (3) and (4), respectively;
said PEKK polymer being characterized by % [F]>45 $(\mu eq/g)/(g/10\ min)^{0.29}$ and
T/I ratio greater than 61/39, more preferably of at least 65/35, most preferably at least 68/32,
wherein
% [F] is the ratio between [F], i.e. the concentration of fluorine end groups in the PEKK polymer measured by 19F-NMR, and MFI, i.e. the melt flow index of the PEKK polymer determined according to ASTM D1238 at 360° C. with a 8.4 Kg weight to the 0.29 power; and
T/I ratio is the ratio between recurring units ($R^{P^*}_{PEKK}$) and recurring units ($R^{M^*}_{PEKK}$).

In a third aspect, the present invention relates to a method [method ($M_C$)] of making a composite comprising a polymer matrix including a poly(ether ketone ketone) polymer [$PEKK_C$ polymer], said method comprising the following steps:
(I*) preparing a poly(ether ketone ketone) ($PEKK_C$) polymer by reacting, in a reaction mixture, at least one low-metal bis(hydroxybenzoyl) benzene monomer [monomer (HB)] and at least one low-metal bis(halobenzoyl) benzene monomer [monomer (FB)] in the presence of $Na_2CO_3$, $K_2CO_3$ and a solvent,
wherein the relative amounts of the components reactants in step (I) are selected according the following Formulae:

$$\Sigma=(\%\ Na_2CO_3-105)+6*|\%\ K_2CO_3-1|+0.25*|37-\%\ Monomers|-(\%\ XS_{DFDK}) \tag{EQ1}$$

and $$0\%\leq K_2CO_3<5\ \text{and} \tag{EQ2}$$

$$0\%<\%\ XS_{DFDK}\ \text{and} \tag{EQ3}$$

$$25\%\leq Monomers\leq 44\%\ \text{and} \tag{EQ4}$$

wherein
(a) $\Sigma<6$
(b) % $Na_2CO_3$ is the concentration, in mol. %, of $Na_2CO_3$ relative to the number of moles of said monomer (HB);
(c) % $K_2CO_3$ is the concentration, in mol. %, of $K_2CO_3$ relative to the number of moles of said monomer (HB) and where % $K_2CO_3$ ranges from 0 mol. % to less than 5 mol. %;

(d) % Monomers is the total concentration, in wt. %, of said monomer (HB) and said monomer (FB), relative to the weight of said monomer (HB), of said monomer (FB) and solvent, and where % Monomers is from 25 wt. % to 44 wt. %; and (e) % $XS_{DFDK}$ is the concentration, in mol. %, of said monomer (FB) in excess of an equimolar concentration of said monomer (HB);

said monomer (HB) and said monomer (FB) being independently represented by one of the following formulae:

$$X^5\text{-}M_m\text{-}X^5 \quad (13)$$

$$X^6\text{-}M_p\text{-}X^6 \quad (14)$$

wherein $X^5$ and $X^6$ are —OH for said monomers (HB) and halogen, preferably Cl or F, more preferably F, for said monomers (FB), and $M_m$ and $M_p$ are represented by the following formulae, respectively:

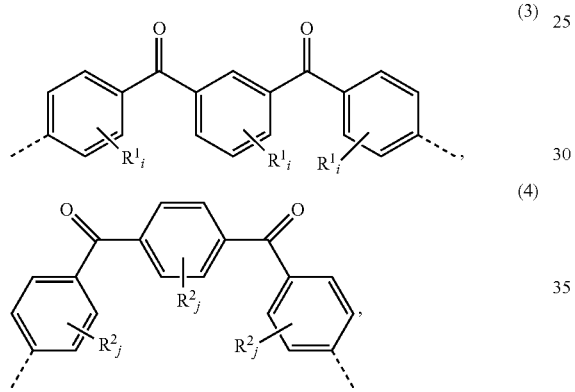

wherein each of R1 and R2 is independently selected from the group consisting of alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each of i and j is independently selected from 0 or an integer from 1 to 4;

to provide a polymer matrix comprising at least one $PEKK_C$ polymer comprising at least one recurring unit ($R^{M*}_{PEKK}$) of general formula -[$M_m$-O—]-; and at least one recurring unit ($R^{P*}_{PEKK}$) of general formula -[$M_p$-O—]-;

wherein $M_m$ and $M_p$ are represented above formulae (3) and (4), respectively; and (II*) impregnating reinforcing fibers with the polymer matrix as obtained in step (I*) above, to form a composite.

In a further aspect, the present invention relates to a composite material obtained by method ($M_C$) described above.

According to this aspect, the present invention relates to a composite [composite (C)] comprising reinforcing fibers in said polymer matrix comprising a $PEKK_C$ polymer as described above and further characterized by a complex viscosity ratio 120/10 (parallel plates) as measured according to ASTM D4440 at 410° C., under nitrogen, 10 rad/s, 1% strain at 10 and 120 minutes, ranging from 1.0 to 3.5.

In another aspect, the present invention relates to a composite [composite ($C_S$)] comprising said $PEKK_S$ polymer as defined above and at least one reinforcing fiber, which is preferably selected from glass fibers or carbon fibers.

BRIEF DESCRIPTION OF THE FIGURE

The FIGURE is a plot showing time vs. complex viscosity the PEKK polymer of Comparative Example 2 and the PEKK polymer of Example 5.

DETAILED DESCRIPTION OF THE INVENTION

For the purposes of the present description:

the use of parentheses before and after symbols or numbers identifying compounds, chemical formulae or parts of formulae has the mere purpose of better distinguishing those symbols or numbers from the rest of the text and hence said parentheses can also be omitted;

the expression "low-metal monomer" is intended to indicate a monomer for which the sum of the concentrations of sodium and potassium is less than 25 wt·ppm, and the concentration of calcium is less than 10 wt·ppm, where the metal concentrations are determined by inductively coupled plasma optical emission spectrometry ("ICP-OES") as described in the Examples. Low-metal monomers can be prepared by methods known to those of skill in the art, for example, by the methods described in International Application No. EP2017/083672, filed Dec. 19, 2017, which is incorporated herein by reference in its entirety;

the expression "crystalline PEKK polymer" is intended to indicate a PEKK polymer having a heat of fusion of at least 5 J/g, determined as the net (i.e. taking into account cold crystallization) area under the melting endotherm on the second heat scan in a differential scanning calorimeter (DSC) according to ASTM D3418-03 and E793-06, using heating and cooling rates of 20° C./min;

the expression "PEKK polymer" is intended to refer to both said $PEKK_S$ polymer and said $PEKK_C$ polymer, unless otherwise specified.

Said polymer matrix includes at least one $PEKK_C$ polymer obtained from method ($M_C$) described above and, optionally, one or more additives. Said polymer matrix can be prepared via methods well-known in the art, which include for example dry-blending of the PEKK polymer and any additional additive.

In some embodiments, the PEKK polymer is ground to a fine powder having a mean particle size less than 50 μm, preferably less than 30 μm.

Preferably, the PEKK polymer contains at least one recurring unit ($R^M_{PEKK}$) and at least one recurring unit ($R^P_{PEKK}$).

Each recurring unit ($R^M_{PEKK}$) is represented by a formula according to the general formula (1)

$$\text{-[-}M_m\text{-O—]-} \quad (1)$$

and each recurring unit ($R^P_{PEKK}$) is represented by a formula according to the following general formula (2):

$$\text{-[-}M_p\text{-O—]-} \quad (2)$$

where $M_m$ and $M_p$ are represented by the following general formulae (3) and (4), respectively:

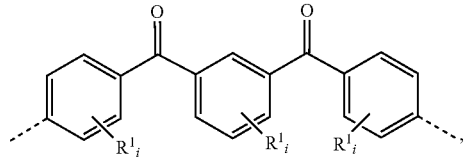

(3)

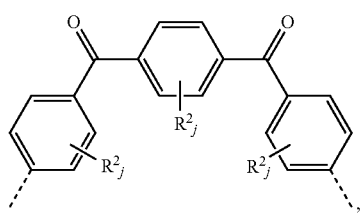

(4)

wherein
$R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
i and j, at each instance, is an independently selected integer ranging from 0 to 4.

As used herein, a dashed bond indicates a bond to an atom outside of the drawn structure. The subscripts "p" and "m" on the species "M" reflect the respective para (Formulae (4)) and meta (Formula (3)) benzoyl substitutions on the central benzene ring.

In some embodiments, each i and j are zero.

For clarity, in some embodiments, the PEKK polymer has a plurality of recurring units ($R^M_{PEKK}$), a plurality of recurring unit ($R^P_{PEKK}$), or both, with each recurring unit being distinct. Accordingly, reference to recurring units ($R^M_{PEKK}$) references all types of recurring units in PEKK according to general Formula (1) and reference to recurring units ($R^P_{PEKK}$) references all types of recurring units in PEKK according to general Formula (2).

As used herein, PEKK polymer refers to any polymer in which the total concentration of recurring units ($R^M_{PEKK}$) and recurring units ($R^P_{PEKK}$) is at least 50 mol. %, relative to the total number of moles of recurring unit in the PEKK polymer. In some embodiments, the total concentration of recurring units ($R^M_{PEKK}$) and recurring units ($R^P_{PEKK}$) is at least 60 mol. %, at least 70 mol. %, at least 80 mol. %, at least 90 mol. %, at least 95 mol. % or at least 99 mol. %, relative to the total number of moles of recurring units in the PEKK polymer.

Advantageously, in said $PEKK_C$ polymer, the ratio of the total number of moles of recurring units ($R^P_{PEKK}$) to the total number of moles of recurring units ($R^M_{PEKK}$) ("($R^P_{PEKK}$)/($R^M_{PEKK}$) ratio" or "T/I ratio") ranges from 55/45 to 75/25, preferably from 60/40 to 80/20, more preferably from 62/38 to 75/25.

Advantageously, in said $PEEK_S$ polymer, the ratio of the total number of moles of recurring units ($R^P_{PEKK}$) to the total number of moles of recurring units ($R^M_{PEKK}$) ("($R^P_{PEKK}$)/($R^M_{PEKK}$) ratio") is at least about 1:1, at least about 1.2:1, at least about 1.3:1, at least about 1.4:1. Additionally or alternatively, the ($R^P_{PEKK}$)/($R^M_{PEKK}$) ratio is no more than about 5.7:1, no more than about 5:1, no more than about 4:1, no more than about 3.5:1 or no more than about 3:1, or no more than about 2.7:1.

In some embodiments, recurring units ($R^M_{PEKK}$) include a recurring unit ($R^{M1}_{PEKK}$) and recurring ($R^P_{PEKK}$ includes recurring units ($R^{P1}_{PEKK}$), ($R^{P2}_{PEKK}$), and ($R^{P3}_{PEKK}$).

Preferably, recurring units ($R^{M1}_{PEKK}$), ($R^{P1}_{PEKK}$), ($R^{P2}_{PEKK}$) and ($R^{P3}_{PEKK}$) are represented by the following formulae (5) to (8), respectively:

  (5)

  (6)

  (7)

  (8)

wherein
$M^{1*}_m$, $M^{1*}_p$, $M^{2*}_p$, and $M^{3*}_p$, are represented by the following formulae (9) to (12), respectively:

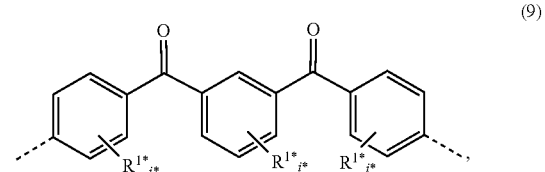

(9)

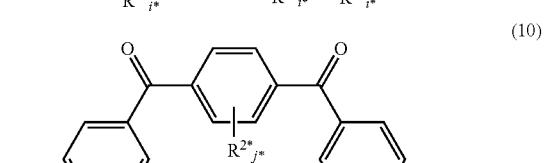

(10)

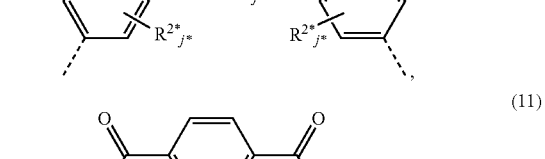

(11)

, and

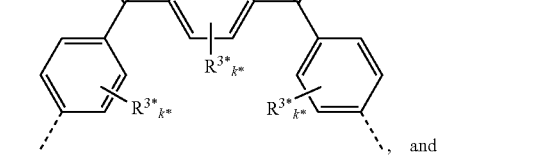

(12)

wherein
$R^{1*}$, $R^{2*}$, $R^{3*}$ and $R^{4*}$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i*, j*, k* and L*, at each instance, is an independently selected integer ranging from 0 to 4.

In some embodiments, each i*, j*, k* and L* is zero.

In some embodiments, the total concentration of recurring unit ($R^{M1}_{PEKK}$) and recurring units ($R^{P1}_{PEKK}$), ($R^{P2}_{PEKK}$) and ($R^{P3}_{PEKK}$), is at least 50 mol %, at least 60 mol %, at least 70 mol %, at least 80 mol %, at least 90 mol %, at least 95 mol % or at least 99 mol %, or 100 mol %, relative to the total number of moles of recurring units ($R^{M}_{PEKK}$) and recurring units ($R^{P}_{PEKK}$). In some embodiments, ratio of the total number of moles of recurring units ($R^{P1}_{PEKK}$), ($R^{P2}_{PEKK}$), and ($R^{P3}_{PEKK}$) to the number of moles of recurring unit ($R^{M1}_{PEKK}$) is within the ranges above described with respect to recurring units ($R^{M}_{PEKK}$) and ($R^{P}_{PEKK}$).

As noted above, the PEKK$_C$ polymers of interest unexpectedly exhibit improved melt stability as compared with PEKK polymers made by conventional methods. Thus, in some embodiments, the PEKK polymer exhibits a complex viscosity ratio 120/10 (parallel plates) as measured according to ASTM D4440 at 410° C., under nitrogen, 10 rad/s, 1% strain at 10 and 120 minutes, ranging from 1.0 to 3.0, 1.0 to 2.5, 1.0 to 2.4. Moreover, in some embodiments, the PEKK$_C$ polymer exhibits a melt stability (VR40) ranging from 1.0 to 1.3, preferably from 1.0 to 1.25 as measured according to ASTM D3835 as described in the Examples below.

As noted above, the PEKK$_S$ polymers have unexpectedly lower melt viscosity ("MV") for a given $\eta_{inh}$, e.g., they exhibit a lower melt viscosity for a the same mechanical properties. The PEKK$_S$ polymers described herein can have a ΔMV that is no more than −2 Pa·s, where $$\Delta MV = MV^{(e)} - MV \quad \text{and} \quad (E1)$$

$$MV^{(e)} = m_{mv}\eta_{inh}^n, \quad (E2)$$

and where $MV^{(e)}$ is the expected melt viscosity (in Pascal·seconds ("Pa·s")) and $\eta_{inh}$ is the inherent viscosity (in deciliters per gram ("dL/g")) of the PEKK polymer.

The parameters $m_{mv}$ and n in equation E2 can be determined empirically by plotting MV vs. $\eta_{inh}$ for various traditional PEKK polymers and fitting to the curve $MV = m_{mv}\eta_{inh}^n$.

For the PEKK polymers having ($R^P_{PEKK}$)/($R^M_{PEKK}$) from 61:39 to 65:35, MV is measured at 410° C. as described in the examples below and $m_{mv}$=1006 (Pa·s)(g/dL)$^{3.90}$ and n=3.90

For the preferred PEKK polymers having ($R^P_{PEKK}$)/($R^M_{PEKK}$) ratio greater than 65:35 (1.86:1) to 75:25 (3.00:1), MV is measured at 380° C. as described in the examples below and $m_{mv}$=1490 (Pa·s)(g/dL)$^{3.98}$ and n=3.98, also as demonstrated in the Examples below. MV and $\eta_{inh}$ are measured as described in the Examples below. In some embodiments, the PEKK polymers can have ΔMV that is no more than about −3 Pa·s, no more than about −5, no more than about −10, no more than about −12, no more than about −30, no more than −40, no more than −50, or no more than −60.

The PEKK polymer can have a $T_m$ from 280° C. to 370° C., from 285° C. to 360° C., or from 290° C. to 350° C. The $T_m$ is measured by DSC at 20° C./min as described in the examples.

The PEKK polymers can have a $\eta_{inh}$ of at least 0.40 dL/g, at least 0.50 dL/g, or at least 0.60 dL/g. Additionally or alternatively, the PEKK polymers can have a $\eta_{inh}$ of no more than 1.50 dL/g, no more than 1.40 dL/g, or no more than 1.2 dL/g. $\eta_{inh}$ is measured as described in the Examples below.

Advantageously, the PEKK$_C$ polymer of the invention has a % [F] (the ratio between [F], i.e. the concentration of fluorine end groups in the PEKK polymer measured by 19F-NMR, and MFI, i.e. the melt flow index of the PEKK polymer determined according to ASTM D1238 at 360° C. with a 8.4 Kg) to the 0.29 power of at least 45 (μeq/g)/(g/10 min)$^{0.29}$, or preferably higher than 50 (μeq/g)/(g/10 min)$^{0.29}$, more preferably at least 60 (μeq/g)/(g/10 min)$^{0.29}$.

Advantageously, the PEKK$_C$ polymers of the invention has a phosphorus level of at least 30 ppm as measured in the examples by ICP-OES, more preferably at least 40 ppm, most preferably at least 60 ppm.

As mentioned above, it was found that the polymer synthesis methods described herein produces PEKK polymers having unexpectedly improved melt stability. The synthesis approach involves the use of low-metal monomers and selective control of the reactants, as well as other components of the synthesis scheme. More specifically, the synthesis approach involves reacting a blend of low-metal bis(hydroxybenzoyl) benzene monomers and bis(halobenzoyl) benzene monomers in the presence of sodium carbonate, Na$_2$CO$_3$, and a solvent, where the relative amounts of the aforementioned components are selected to achieve PEKK polymers having unexpectedly increased melt stability.

In general, the PEKK polymers of interest herein include recurring units formed from the polycondensation of low-metal 1,3-bis(benzoyl) monomers and 1,4-bis(benzoyl) monomers having the following general formulae, respectively,

$$X^5\text{-}M_m\text{-}X^5 \quad (13)$$ and

$$X^6\text{-}M_p\text{-}X^6 \quad (14)$$

wherein $X^5$ is an —OH or halogen and $X^6$ is an —OH or halogen.

As used herein, a halogen refers to any one of F, Cl, Br, and I. Preferably the halogen is F or Cl, more preferably the halogen is F.

As used herein, a 1,3-bis(benzoyl) benzene monomer refers to a monomer represented by Formula (13) and 1,4-bis(benzoyl) benzene monomer refers to a monomer represented by Formula (14). Additionally, a bis(hydroxybenzoyl) benzene monomer refers to a monomer represented by Formula (13) or (14) where $X^5$ or $X^6$, respectively, is an —OH. A bis(halobenzoyl) benzene monomer refers to a monomer represented by Formula (13) or (14) where $X^5$ or $X^6$, respectively, is a halogen. For example, a 1,3-bis(hydroxybenzoyl) benzene monomer (1,3 BHBB) refers to a monomer of Formula (13) where $X^5$ is —OH. As another example, a 1,4-bis(halobenzoyl) benzene monomer refers to a monomer of Formula (14) where $X^6$ is a halogen, such as, for example, 1,4-bis(4'-fluorobenzoyl) benzene (1,4-DFDK).

For ease of reference, in method (M$_S$) as described above, Na$_2$CO$_3$, K$_2$CO$_3$, monomer(s) (HB), monomer(s) (FB) and solvent are collective referred to as "reaction components."

Preferably, for the PEKK polymers according to the present invention, Σ is preferably <5.5, more preferably Σ<5.0, still more preferably <4.0, <3.0, <2.0, and most preferably <1.5.

For PEKK polymers having a ($R^P_{PEKK}$)/($R^M_{PEKK}$) ratio of more than 65/35 (1.86:1) to 75/25 (3.00:1), Σ<6.0, preferably Σ<5.5, more preferably Σ<5.0.

With respect to % Na$_2$CO$_3$ and % K$_2$CO$_3$, in some embodiments, % Na$_2$CO$_3$+% K$_2$CO$_3$≤106.0%. % Na$_2$CO$_3$+% K$_2$CO$_3$ is preferably at least 95%, more preferably at least 100%, more preferably at least 102% and even more preferably of at least 103.5%. Preferably, the Na$_2$CO$_3$ meets the particle size distribution requirements as detailed in U.S. Pat. No. 9,175,136, to Louis, filed Oct. 23, 2009 and incorporated herein by reference in its entirety.

As noted above, each recurring unit ($R^M_{PEKK}$) and ($R^P_{PEKK}$) is formed from the polycondensation of a monomer (HB) and a monomer (FB), such that the number of moles of monomers (HB) and monomers (FB) is equimolar.

Accordingly, in embodiments in which % XS$_{DFDK}$>0, the monomer blend includes more moles of monomers (FB), relative to the number of moles of monomers (HB). In some such embodiments, % XS$_{DFDK}$ ranges from 0.1 mol % to 10.0 mol %, preferably from 0.3 mol % to 5.0 mol %, more preferably from 0.5 to 3.0 mol %, most preferably from 0.8 to 2.5 mol %.

For said PEKK$_S$ polymer, preferably said % XS$_{DFDK}$ is from 0.7 mol. % to 10.0 mol. %, preferably from 0.75 mol. % to 5.0 mol. %, more preferably from 0.8 to 3.0 mol. %.

With respect to the solvent, it can include, but is not limited to, diphenyl sulfone, dibenzothiophene dioxide, benzophenone or combinations of any one or more thereof. Preferably, the solvent includes diphenyl sulfone. More preferably, the solvent includes at least 90 wt. %, at least 95 wt. %, at least 98 wt. % or at least 99 wt. % diphenyl sulfone. In some embodiments, the diphenyl sulfone is used in the synthesis method described herein includes limited amounts of impurities, as detailed in U.S. Pat. No. 9,133,111, to Louis et al., filed Apr. 7, 2014 and incorporated herein by reference.

With respect to the relative concentration of monomers (HB) and monomers (FB), it is noted that each recurring unit of ($R^M_{PEKK}$) and recurring units ($R^P_{PEKK}$) is formed from the polycondensation of a monomer (HB) selected from 1,3-bis(hydroxybenzoyl) benzene monomer or 1,4-bis(hydroxybenzoyl) benzene monomer, and a monomer (FB) selected from 1,3-bis(halobenzoyl) benzene monomer or 1,4-bis(halobenzoyl) benzene monomer.

More specifically, each recurring unit ($R^M_{PEKK}$) is formed from the polycondensation of two, distinct 1,3-bis(benzoyl) benzene monomers; or from the polycondensation of a 1,3-bis(benzoyl) benzene monomer and a 1,4-bis(benzoyl) benzene monomer. Analogously, each recurring unit ($R^P_{PEKK}$) is formed from the polycondensation of two, distinct 1,4-bis(benzoyl) benzene monomers; or from the polycondensation of a 1,3-bis(benzoyl) benzene monomer and a 1,4-bis(benzoyl) benzene monomer. For example, the polycondensation of a monomer according to the formula X$^5$-M$_m$-X$^5$ (1,3-bis(benzoyl) benzene) with a monomer according to the formula X$^6$-M$_p$-X$^6$ (1,4-bis(benzoyl) benzene), forms recurring units ($R^P_{PEKK}$) and ($R^M_{PEKK}$), where X$^5$ is an —OH or halogen and X$^6$ is a halogen if X$^5$ is an —OH and X$^6$ is an —OH if X$^5$ is a halogen. As another example, the polycondensation of a monomer according to the formula X$^5$-M$_m$-X$^5$ (1,3-bis(benzoyl) benzene) with a monomer according to the formula X$^7$-M*$_m$-X$^7$ (1,3-bis(benzoyl) benzene) forms recurring units ($R^M_{PEKK}$), where M*$_m$ is represented by a Formula (13), the same or distinct from M$_m$, and where X$^5$ is an —OH or halogen and X$^7$ is a halogen if X$^5$ is an —OH and X$^7$ is an —OH if X$^5$ is a halogen. As yet another example, the polycondensation of a monomer according to the formula X$^6$-M$_p$-X$^6$ (1,4-bis(benzoyl) benzene) with a monomer according to the formula X$^8$-M*$_p$-X$^8$ (1,4-bis(benzoyl) benzene), forms recurring units ($R^P_{PEKK}$), where M*$_p$ is represented by a Formula (14), the same or distinct from M$_p$, and where X$^6$ is an —OH or halogen and X$^8$ is a halogen if X$^6$ is an —OH and X$^8$ is an OH if X$^6$ is a halogen.

Preferably, the PEKK$_C$ polymers of interest herein have a ($R^P_{PEKK}$)/($R^M_{PEKK}$) ratio ranging from 55/45 to 75/25.

In a preferred embodiment, said PEKK$_S$ polymers have a ($R^P_{PEKK}$)/($R^M_{PEKK}$) ratio greater than 61/39, preferably of at least 65/35, most preferably at least 68/32 and up to 75/25.

Accordingly, the ratio of the number of moles of 1,4-bis (benzoyl) benzene monomers to the number of moles of 1,3-bis(benzoyl) benzene monomers ("1,4/1,3 ratio") in the blend of monomers (HB) and monomers (FB) ranges from 55/45 to 75/25 for said PEKK$_C$ polymer while for said PEKK$_S$ polymer is greater than 61/39, preferably of at least 65/35, most preferably at least 68/32 and up to 75/25. As long as the aforementioned 1,4/1,3 ratio is satisfied, the relative amount of monomers (HB) and monomers (FB) that are 1,4-bis(benzoyl) benzene and 1,3-bis(benzoyl) benzene monomers is not particularly limited. In some embodiments, at least 90 mol. %, at least 95 mol. % or at least 99 mol. % of the 1,3-bis(benzoyl) benzene monomers are either 1,3-bis(hydroxybenzoyl) benzene monomers or 1,3-bis(halobenzoyl) benzene monomers, relative to the number of moles of recurring units ($R^M_{PEKK}$) in the PEKK polymer.

Significantly, the prescribed concentrations of the reaction components, as well as other concentrations of the reaction components described herein, are relative to the quantities of the reaction components used to form recurring units ($R^M_{PEKK}$) and ($R^P_{PEKK}$). Put another way, one or more of the reaction components can be independently incorporated into the reaction mixture at distinct points during the reacting. In some embodiments, the reaction mixture contains each of the reaction components in the quantities prescribed by Formulae (EQ1)-(EQ4) ("prescribed quantity") and the prescribed quantities of bis(hydroxybenzoyl) benzene monomers and bis(halobenzoyl) benzene monomers are reacted simultaneously. For example, in one such embodiment, the reaction mixture contains, simultaneously, Na$_2$CO$_3$, K$_2$CO$_3$, bis(hydroxybenzoyl) benzene monomers, bis(halobenzoyl) benzene monomers and solvent in their prescribed quantities prior to the reacting and the corresponding monomers are reacted therein.

In alternate embodiments, one or more of the reaction components can be added to the reaction mixture at different points prior to or during the reacting. In some such embodiments, a portion of the prescribed quantity of one or more of the reaction components is added to the reaction mixture prior to the reacting and the remainder of the prescribed quantity of the one or more components is added to the reaction mixture during the reacting.

In a preferred embodiment, at least 90 mol. %, at least 95, or at least 99 mol. % of the 1,3-bis(benzoyl) benzene monomers forming recurring units ($R^M_{PEKK}$) are added to the reaction mixture either prior to the reacting or during the reaction and at least 90 mol. %, at least 95, or at least 99 mol. % of the 1,4-bis(benzoyl) benzene monomers forming the remaining recurring units ($R^P_{PEKK}$) are added to the reaction mixture during the reacting or prior to the reacting, respectively.

In another preferred embodiment, the prescribed quantity of solvent is present in the reaction mixture prior to the reacting.

In some embodiments, the prescribed quantity of Na$_2$CO$_3$ and K$_2$CO$_3$ can be added to the reaction mixture either prior to the reacting or during the first reaction.

Based upon the description herein, a person of ordinary skill in the art will recognize additional methods of the adding the individual reaction components to the reaction mixture.

The reacting can include a first heating in which the reaction mixture is heated to maintain its temperature within a first temperature range of from 180° C. to 270° C. In some embodiments, the first heating can include maintaining the temperature of the reaction mixture within the first temperature range for a first period of time. The first period of time can be from 5 minutes ("min.") to 300 min., from 7 min. to 240 min. or from 10 min. to 180 min or from 15 min to 120 min. As noted above, one or more of the reaction components can be independently added to the reaction mixture at distinct points during the reacting. In some embodiments, each of reaction components, in their prescribed quantities, is added to the reaction mixture prior to the first heating. In alternate embodiments, at least one or more of the reaction components is added to the reaction mixture during the first heating and the remainder of the reaction components are added to the reaction mixture prior to the first heating. In some such embodiments, the prescribed quantity of the one or more reaction components is added to the reaction mixture during the first heating (e.g. the full amount of the one or more reaction components). In alternative such embodiments, only a portion of the prescribed quantity of the one or more reaction components is added to the reaction mixture during the first heating and the remaining portion is added to the reaction mixture prior to the first heating. In general, each reaction component is present in the reaction mixture in its prescribed quantity prior to the end of the first heating. In such embodiments, the first time period is relative to the point in time at which the prescribed quantity of each reaction component has been added to the reaction mixture. In a preferred embodiment, at least 90 mol. %, at least 95, or at least 99 mol. % of the 1,3-bis(benzoyl) benzene monomers forming recurring units ($R^M_{PEKK}$) are added either prior to the first heating or during the first heating and wherein at least 90 mol. %, at least 95, or at least 99 mol. % of the 1,4-bis(benzoyl) benzene monomers forming the remaining 1,4-bis(benzoyl) benzene monomers are added during the first heating or prior to the first heating, respectively.

In some embodiments, the reacting further includes a second heating, subsequent to the first heating, in which the reaction mixture is heated to maintain its temperature within a second temperature range that is from 300° C. to 340° C.

In some such embodiments, the reaction mixture can be maintained within the second temperature range for a second period of time. The second period of time period can be from 0 to 240 min., from 0 to 180 min., or from 0 to 120 min.

In some embodiments, the second heating further includes adding an end-capping agent to the reaction mixture.

The end-capping agent controls the molecular weight of the PEKK polymer by terminating the polymerization reaction at a selected point during polymerization. In such embodiments, the second heating includes the second addition.

Desirable end-capping agents include those represented by the following formula:

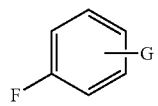

where G is —C(O)—Ar or —S(O$_2$)—Ar, and Ar is an arylene group.

In some embodiments, the end-capping agent is an excess of a bis(halobenzoyl) benzene monomer (1,3-bis(halobenzoyl) benzene monomer or 1,4-bis(halobenzoyl) benzene monomer) used to form recurring units ($R^M_{PEKK}$) or recurring units ($R^P_{PEKK}$) of the PEKK polymer.

For the PEKK$_C$ polymer of the invention, an excess refers to amount of the 1,3-bis(halobenzoyl) benzene monomer or 1,4-bis(halobenzoyl) benzene monomer greater than the amount that would bring the total amount of the respective monomer added to the reaction mixture to at least 1.03 times an equimolar amount to the bis(hydroxybenzoyl) benzene monomer, preferably at least 1.04, more preferably at least 1.05. For clarity, in embodiments, in which the end-capping agent is a bis(halobenzoyl) benzene monomer used to form recurring units ($R^M_{PEKK}$) or recurring units ($R^P_{PEKK}$), the amount of end-capping agent is not included in the % $XS_{DFDK}$.

In some embodiments, the PEKK$_C$ polymer includes greater than 50 mol. %, preferably greater than 55 mol. %, 60 mol. %, 65 mol. %, 70 mol. %, 75 mol. %, 80 mol. %, 85 mol. %, 90 mol. %, 95 mol. %, 99 mol. % of non-reactive end groups as determined by nuclear magnetic resonance spectroscopy (NMR). As used herein, a "non-reactive end group" is a group that is not an —OH group that forms a terminal end of a polymer chain. Preferably, the non-reactive group is a 1,4-bis(halobenzoyl) benzene group. Most preferably, the non-reactive group includes a terminal fluorine.

For the PEKK$_S$ polymer of the invention, an excess refers to amount of the 1,3-bis(halobenzoyl) benzene monomer or 1,4-bis(halobenzoyl) benzene monomer greater than the amount that would bring the total amount of the respective monomer added to the reaction mixture to at least 1.08 times an equimolar amount to the bis(hydroxybenzoyl) benzene monomer, preferably at least 1.10, more preferably at least 1.12. For clarity, in embodiments, in which the end-capping agent is a bis(halobenzoyl) benzene monomer used to form recurring units ($R^M_{PEKK}$) or recurring units ($R^P_{PEKK}$), the amount of end-capping agent is not included in the % $XS_{DFDK}$.

In some embodiments of the method for forming a PEKK polymer, monomers (HB) and monomers (FB) collectively include at least one first 1,3-bis(benzoyl) benzene monomer, at least one first 1,4-bis(benzoyl) benzene monomer, at least one second 1,4-bis(benzoyl) benzene monomer, and at least one third 1,4-bis(benzoyl) benzene monomer, where each 1,3-bis(benzoyl) benzene monomer is represented by a formula according to Formula (13) and each 1,4-bis(benzoyl) benzene monomer is represented by a formula according to Formula (14). In some such embodiments, one of the at least one first 1,3-bis(benzoyl) benzene monomer, one of the at least one first 1,4-bis(benzoyl) benzene monomer, one of the at least one second 1,4-bis(benzoyl) benzene monomer, and one of the at least one third 1,4-bis(benzoyl) benzene monomer are represented by the following formulae, respectively:

  (16)

  (17)

  (18)

  (19)

wherein
  $X^1$ is —OH or a halogen;
  $X^2$ is a halogen if $X^1$ is an —OH and $X^2$ is an —OH if $X^1$ is a halogen;
  $X^3$ is an —OH or a halogen; and
  $X^4$ is an halogen if $X^3$ is an —OH and $X^4$ is an —OH if $X^3$ is a halogen.

In some such embodiments, monomers $X^1\text{-}M^{*1}_m\text{-}X^1$ and $X^2\text{-}M^{*1}_p\text{-}X^2$ polycondense to form recurring units ($R^{M1}_{PEKK}$) and ($R^{P1}_{PEKK}$), respectively, and monomers $X^3\text{-}M^*_p\text{-}X^3$ and $X^4\text{-}M^*_p\text{-}X^4$ polycondense to form recurring units ($R^{P2}_{PEKK}$), and ($R^{P3}_{PEKK}$), respectively.

In some such embodiments $X^1$ and $X^3$ are —OH. In some embodiments, each i*, j*, k* and L* are zero, such that recurring units ($R^{P1}_{PEKK}$), ($R^{P2}_{PEKK}$) and ($R^{P3}_{PEKK}$) are identical.

Said method ($M_C$) can further comprise after said step (I*) and before said step (II*), a step (I*b) of isolating a composition comprising said at least one PEKK polymer by extracting the solvent (e.g. diphenyl sulfone) and residual salts with acetone and water at a pH ranging from 1 to 12.

In addition, said method ($M_C$) can further comprise after said step (I*) and before said step (I*b) or said step (II*), a step of isolating a composition comprising said at least one $PEKK_C$ polymer. Preferably, said step is performed by washing the polymer matrix comprising at least one $PEKK_C$ polymer as obtained after step (I*b) with a solution of at least one of sodium dihydrogen phosphate ($NaH_2PO_4 \cdot 2H_2O$) and disodium hydrogen phosphate ($Na_2HPO_4$).

Preferably, the polymer matrix comprising at least one $PEKK_C$ polymer as obtained after step (I*b) is contacted with a solution, e.g. and aqueous solution, including both $NaH_2PO_4 \cdot 2H_2O$ and $Na_2HPO_4$. The concentration of $NaH_2PO_4 \cdot 2H_2O$ in the solution preferably ranges from 0.01 to 0.20 wt. %, preferably from 0.02 to 0.15 wt. %, most preferably from 0.03 to 0.10 wt. %, and the concentration of the $Na_2HPO_4$ preferably ranges from 0.01 to 0.20 wt. %, preferably from 0.02 to 0.15 wt. %, most preferably from 0.03 to 0.10 wt. %.

As mentioned above, said step (II) of isolating a composition comprising said at least one $PEKK_S$ polymer is performed by washing said composition with a solution containing $NaH_2PO_4$ and $Na_2HPO_4$.

Preferably, in said step (II), the concentration of $NaH_2PO_4$ in the solution preferably ranges from 0.01 to 0.20 wt. %, preferably from 0.02 to 0.15 wt. %, most preferably from 0.03 to 0.10 wt. %, and the concentration of the $Na_2HPO_4$ preferably ranges from 0.01 to 0.20 wt. %, preferably from 0.02 to 0.15 wt. %, most preferably from 0.03 to 0.10 wt. %.

Preferably, the polymer matrix as described above can include one or more additional ingredients selected from the group consisting of (i) colorants (e.g. a dye); (ii) pigments (e.g., titanium dioxide, zinc sulfide and zinc oxide); (iii) light stabilizers (e.g. UV stabilizers); (iv) heat stabilizers; (v) antioxidants (e.g. organic phosphites and phosphonites); (vi) acid scavengers (vii) processing aids (viii) nucleating agents (ix) plasticizer, internal lubricants, and external lubricants; (x) flame retardants (xi) smoke-suppressing agents (x) anti-static agents (xi) anti-blocking agents (xii) conductivity additives (e.g. carbon black and carbon nanofibrils) (xiii) plasticizers; (xiv) flow modifiers; (xv) extenders; (xvi) metal deactivators and any combination of one or more thereof.

Preferably, the total concentration of additional ingredients is less than 20%, preferably less than 10%, more preferably less than 5% and even more preferably less than 2%, based upon the total weight of the polymer matrix. The PEKK polymers described herein can be desirably used in polymer compositions and incorporated into shaped articles, including but not limited to, mobile electronic devices, medical devices, and composite materials. Furthermore, the PEKK polymers, or compositions thereof, can also be desirably used in additive manufacturing application settings.

Polymer compositions including the PEKK polymers ("PEKK polymer compositions") can include a reinforcing filler.

The reinforcing fibers may be organic or inorganic.

Suitable fibers for use as the reinforcing fiber component include, for example, carbon fibers, graphite fibers, glass fibers, such as E glass fibers, ceramic fibers, such as silicon carbide fibers, synthetic polymer fibers, such as aromatic polyamide fibers, polyimide fibers and polybenzoxazole fibers. The areal weight of a single layer or cross section of such fibers can vary, for example, from 50 to 600 g/m².

In some embodiments, the fibers comprise carbon fibers, glass fibers, or both carbon fibers and glass fibers.

In some embodiments, the fibers comprise carbon fibers, including, for example, carbon fibers that exhibit a tensile strength of greater than or equal to 3.5 GigaPascals ("GPa") and a tensile modulus of greater than or equal to 200 GPa, as measured by ASTM D638.

The fibers may be in the form of whiskers, short fibers, continuous fibers, sheets, plies, and combinations thereof. Continuous fibers may further adopt any of unidirectional, multi-dimensional, non-woven, woven, knitted, stitched, wound, and braided configurations, as well as swirl mat, felt mat, and chopped mat structures. The fiber tows may be held in position in such configurations by cross-tow stitches, weft-insertion knitting stitches, or a small amount of resin, such as a sizing. As used herein "continuous fibers" are fibers having a length greater than 10 mm.

The weight of the reinforcing filler is preferably below 80% wt., more preferably below 70% wt., even more preferably below 65% wt., based on the total weight of the composition.

In some embodiments, the composition comprises the PEKK polymer in combination with one or more than one additional polymeric components, such as polyarylether polymers different from PEKK polymer, including, but not limited to, poly(ether ether ketone) ("PEEK") polymers, poly(ether ketone) ("PEK") polymers, sulfone polymers, and polyaryl sulphide polymers. According to other embodiments, the PEKK polymer, as above detailed, is the only polymeric component in PEKK polymer composition. The expression 'polymeric components' is to be understood according to its usual meaning, i.e. encompassing compounds characterized by repeated linked units, having typically a molecular weight of 2,000 g/mol or more.

The PEKK polymer compositions can be prepared by a variety of methods involving intimate admixing of the PEKK polymer, optionally the reinforcing filler and optionally the above described additional ingredient desired in the PEKK polymer composition, for example by dry blending, suspension or slurry mixing, solution mixing, melt mixing or a combination of dry blending and melt mixing.

It is also possible to manufacture the composition of the invention by further melt compounding the powder mixture as above described. As said, melt compounding can be effected on the powder mixture as above detailed, or directly on the PEKK polymer, as above detailed, the reinforcing filler, as detailed above, and, optionally, other ingredients. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

The present invention further relates to a method of making PEKK composites comprising impregnating the reinforcing fibers described above with the PEKK polymer as defined above.

A polymer matrix including said PEKK polymer and, optionally, one or more additional ingredient as defined above can be advantageously prepared by methods known in the art.

Such methods include, for example, dry-blending of the PEKK polymer and any additional ingredients.

In some embodiments, the PEKK polymer is ground to a fine powder having a mean particle size less than 50 μm, preferably less 35 than 30 μm.

Various methods can be employed by which fibers may be impregnated with the polymer matrix, wherein the matrix is either in molten or particulate form, including, for example, powder coating, film lamination, extrusion, pultrusion, aqueous slurry, and melt impregnation, to form plies in the form of, for example, sheets or tapes of fibers that are at least partially impregnated with the polymer matrix.

As used herein, "tape" means a strip of material with longitudinally extending reinforcement fibers that are aligned along a single axis of the strip material.

Plies of matrix impregnated fibers may be placed adjacent one another to form an unconsolidated composite laminate, such as a prepreg. The fiber reinforced layers of the laminate may be positioned with their respective fiber reinforcements in selected orientations relative to one another.

The plies may be stacked, manually or automatically, e.g., by automated tape layup using "pick and place" robotics, or advanced fiber placement wherein pre-impregnated tows of fibers are heated and compacted in a mold or on a mandrel, to form a composite laminate having desired physical dimensions and fiber orientations.

The layers of an unconsolidated laminate are typically not completely fused together and the unconsolidated composite laminate may exhibit a significant void content, e.g., greater than 20% by volume as measured by x-ray microtomography. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article.

As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content as measured by x-ray microtomography.

The PEKK composite preferably comprises from 20 to 80 wt. % of reinforcing fibers and from 80 to 20 wt. % of the polymer matrix by weight of the PEKK composite.

The PEKK composites described herein can be incorporated into composite articles, including, but not limited to, components for aerospace applications.

In some embodiments, the composite articles are in the form of substantially bidimensional articles.

Bidimensional articles include parts in which one dimension (thickness or height) is significantly less than the other two characterizing dimensions (length and width), for example, films and sheets. In some embodiments, the composite articles are three-dimensional parts. Three-dimensional parts include parts that substantially extend in the three dimensions of space in similar manner, including in the form of parts with complex geometries (e.g., concave or convex sections, possibly including undercuts, inserts, and the like).

In some embodiments, the composite article includes at least one portion having a thickness of at least 4 mm, preferably at least 5 mm.

Due to the unexpectedly improved melt stability of the polymer matrix a composite article including the polymer matrix may exhibit less than 2% voids in portions having a thickness greater than 5 mm.

In some embodiments, the toughness of the PEKK composite exceeds 75% of its initial toughness after being heated at a temperature ranging from 290° C. to 370° C. for 20 minutes, where toughness is measured as compression strength after impact using a 30 J impact energy per ASTM test method D7137/7136.

In some embodiments, the toughness of the PEKK composite exceeds 75% of its initial toughness after being heated at a temperature ranging from 290° C. to 370° C. for 20 minutes, where toughness is measured as mode 1 fracture toughness per ASTM 5228.

The PEKK polymer compositions (or PEKK polymer) can be desirably incorporated into shaped articles. The shaped articles can be made from the PEKK polymer composition using any suitable melt-processing melt processing technique including, but not limited to, extrusion molding, injection molding, and compression molding. In some embodiments, the shaped articles are under the form of substantially bidimensional articles. Bidimensional articles include parts in which one dimension (thickness or height) is significantly less than the other two characterizing dimensions (width and length), for example, films and sheets. In some embodiments, the shaped article can be a coating. In some embodiments, the shaped articles are three-dimensional parts. Three-dimensional parts include parts that substantially extend in the three dimensions of space in similar manner, including under the form of complex geometries parts (e.g., concave or convex sections, possibly including undercuts, inserts, and the like).

In some embodiments, the shaped article is a component of a mobile electronic device. As used herein, a "mobile electronic device" refers to an electronic device that is transported and used in various locations. A mobile electronic device can include, but is not limited to, a mobile phone, a personal digital assistant ("PDA"), a laptop computer, a tablet computer, a wearable computing device (e.g., a smart watch and smart glasses), a camera, a portable audio player, a portable radio, a global position system receiver, and portable game console.

Additionally, due to the improved processability (e.g. lower MV) and higher thermal stability, the PEKK polymers described herein can be desirably used in 3D printing (also known as additive manufacturing) fabrication technique such as fused filament fabrication (FFF) or selective laser sintering (SLS). Additive manufacturing involves the process of joining materials to make articles from 3D model data. The article is generally formed using layer by layer deposition. Commercially available 3D printing fabrication equipments of the FFF type include, as an example, the equipment manufactured by Stratasys, Inc. and sold under the Fortus® trademark. Examples of SLS based 3D printing equipment are available from EOS corporation such as the ones sold under the trade name EOSINT®. In such embodiments, an article can be formed by 3D printing the PEKK polymer (or PEKK polymer composition).

In some embodiments, the shaped articles described herein are medical devices or components of medical devices. As used herein, a "medical device" is an article, instrument, apparatus or machine that is used in the prevention, diagnosis, or treatment of illness or disease, or for detecting, measuring, restoring, correcting, or modifying the structure or function of a human or animal body.

Material selection is critical for medical devices, particularly in instances where the material is implanted in, or comes into contact with, the body. There is a continued need for medical device materials that meet the particular requirements of the medical device in its application setting (e.g. wear resistance), and also reduce or prevent undesirable interactions with the body, such as, for example, the leaching of chemicals from the medical device into the body.

The PEKK polymers described herein may be particularly suitable for use in medical devices, for example, because of their higher purity as reflected in their reduced chlorine and metals content.

Medical devices can generally include surgical devices, non-surgical devices, prosthetic devices, implants, etc.

In some embodiments, the medical device including the PEKK polymers described herein is an implantable medical device (IMD). IMDs are medical devices designed to replace a missing biological structure, support a damaged biological structure, or enhance an existing biological structure in the body. Examples of IMDs include cranial implants such as craniomaxillofacial implants, spinal implants such as spinal cages and spinal disks, finger and toe implants, knee replacements, hip replacements such as acetabular caps, stents, heart valves, pacemakers, and hardware such as bone screws and plates. The medical devices may also include dental devices such as removable full and partial denture frames, crowns, bridges, artificial teeth, and implant bars.

Should the disclosure of any patents, patent applications, and publications which are incorporated herein by reference conflict with the description of the present application to the extent that it may render a term unclear, the present description shall take precedence.

Should the disclosure of any patents, patent applications, and publications which are incorporated herein by reference conflict with the description of the present application to the extent that it may render a term unclear, the present description shall take precedence.

EXPERIMENTAL SECTION

Materials 1,4-Bis(4-phenoxybenzoyl) benzene was prepared according to Russian Published Application No. SU445643 A1 (incorporated herein by reference).

1,2-dichlorobenzene, terephthaloyl chloride, isophthaloyl chloride, 3,5-dichlorobenzoylchloride, aluminum chloride ($AlCl_3$), methanol, $NaH_2PO_4 \cdot 2H_2O$ and $Na_2HPO_4$ were purchased from Sigma Aldrich.

Methanol was obtained from Sigma-Aldrich.

Diphenyl sulfone (polymer grade) (~99.8% pure) was obtained from Proviron.

Sodium carbonate, light soda ash ($d_{90}$ particle size=130 μm), was obtained from Solvay S.A., France and dried before use. Potassium carbonate ($d_{90}$<45 μm) was obtained from Armand products and dried before use.

Lithium chloride (anhydrous powder) was obtained from Acros.

Determination of F End Groups by $^{19}F$ NMR

The F end groups concentration was determined by $^{19}F$-NMR using hexafluoroacetone trihydrate as an external standard.

The F end groups are of the type:

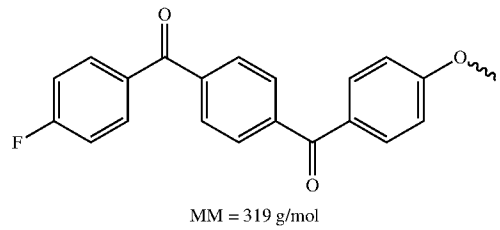

MM = 319 g/mol

The samples (~10 mg) were dissolved in 0.5 ml $CD_2Cl_2$ and 0.5 ml $CH_3SO_3H$. After several attempts clear solutions were finally obtained.

All the NMR spectra were recorded at 30° C. on a 400 MHz NMR Bruker AVANCE spectrometer.

The $^{19}F$ 1D NMR spectrum was taken as follows: an exact known amount of hexafluoroacetone trihydrate was dissolved in 0.5 mL $CD_2Cl_2$ (or $C_2D_2Cl_4$) and 0.5 mL of $CH_3SO_3H$, and a $^{19}F$-NMR spectrum was recorded as the external standard.

The polymer F end group concentration [F] was calculated using the following equation:

$$[F]_{eq} = \frac{I_{Arylfluoride} * HFA \cdot 3H_2O \text{ weight} * 6}{I_{HFA3H_2O} * 220.07 * \text{polymer sample weight}} * 10^6 = \mu eq/g$$

wherein:
all weights are in grams
[F] is in μeq/g
$I_{Arylfluoride}$ is the integral value of the $^{19}F$ NMR signal at −94 to −96 ppm (polymer sample spectrum)
$I_{HFA \cdot 3H_2O}$ is the integral value of the $^{19}F$ NMR signal at −82.5 ppm (external standard spectrum—signal is for 6F).

Determination of Melt Flow Index

The melt flow index was determined according to ASTM D1238 at 360° C. with a 3.8 kg weight. The final MFI indicated in the tables for a 8.4 kg weight was obtained by multiplying the value obtained by 2.35.

Determination of Melt Stability by Capillary Rheology (VR40)

The melt viscosity was measured using a capillary rheometer according to ASTM D3835. Readings were taken after 10 and 40 minute dwell time at 410° C. and a shear rate of 46.3 s$^{-1}$ using a die with the following characteristics: diameter=1.016 mm, length=20.32 mm, cone angle=120°.

The melt stability was evaluated by the ratio of the viscosity at 40 min over 10 min (VR40), with a values closer to 1 being more melt stable.

Determination of Complex Melt Viscosity by Parallel Plates

A 7.62 cm diameter×3 mm plaque was prepared by compression molding under the following conditions:
1. preheat at 368° C.,
2. 368° C./15 minutes, 2000 kg-f 3. 368° C./2 minutes, 2700 kg-f
4. cool down to 30° C. over 40 minutes, 2000 kg-f.

A 25 mm-diameter disk was drilled out of the plaque and analyzed by parallel plates rheology according to ASTM D4440 on a TA ARES RDA3 rheometer.

The complex viscosity was measured at 410° C., under nitrogen, 10 rad/s, 1% strain over a period of 120 minutes.

Determination of Elemental Impurities in Monomers and PEKK Polymers by ICP-OES

A clean, dry platinum crucible was placed onto an analytical balance, and the balance was zeroed. One half to three grams of monomer/polymer sample was weighed into a boat and its weight was recorded to 0.0001 g. The crucible with sample was placed in a muffle furnace (Thermo Scientific Thermolyne F6000 Programmable Furnace). The furnace was gradually heated to 525° C. and held at that temperature for 10 hours to dry ash the sample.

Following ashing, the furnace was cooled down to room temperature, and the crucible was taken out of the furnace and placed in a fume hood. The ash was dissolved in diluted hydrochloric acid. The solution was transferred to a 25 ml volumetric flask, using a polyethylene pipette. The crucible was rinsed twice with approximately 5 mL of ultrapure water (R<18 MΩcm) and the washes were added to a volumetric flask to effect a quantitative transfer. Ultrapure water was added to total 25 mL in the flask. A stopper was put on the top of the flask and the contents were shaken well to mix.

ICP-OES analysis was performed using an inductively-coupled plasma emission spectrometer Perkin-Elmer Optima 8300 dual view. The spectrometer was calibrated using a set of NIST traceable multi-element mixed standards with analyte concentrations between 0.0 and 10.0 mg/L. A linear calibration curve was obtained in a range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation:

$$A = (B * C)/(D)$$

where:
A=concentration of element in the sample in mg/kg (=wt·ppm)
B=element in the solution analyzed by ICP-OES in mg/L
C=volume of the solution analyzed by ICP-OES in mL
D=sample weight in grams used in the procedure.

Determination of Glass Transition Temperature ($T_g$)

The glass transition temperature ($T_g$) was measured in a differential scanning calorimeter (DSC) according to ASTM D3418-03 and E1356-03, and was recorded from the second heat up using the half height method.

Determination of Heat of Fusion (ΔH)

The heat of fusion (ΔH) of polymer powder was determined as the area under the melting endotherm on the second heat scan in a differential scanning calorimeter (DSC) according to ASTM D3418-03 and E793-06, and using heating and cooling rates of 20° C./min. The heat of fusion (ΔH) is determined on the second heat scan and is taken as the area over a linear baseline drawn from above the glass transition temperature ($T_g$) to a temperature above end of the endotherm.

The heat of fusion (ΔH) of molded parts was determined as the area under the melting endotherm on the first heat scan in a differential scanning calorimeter (DSC) according to ASTM D3418-03 and E793-06, and using heating and cooling rates of 20° C./min.

For filled compositions, the heat of fusion (ΔH) measured was corrected for filler content to express the heat of fusion (ΔH) relative to the polymer content only, excluding the filler.

Preparation of Monomers 1,4-bis(4'-fluorobenzoyl) benzene (1,4-DFDK) and 1,3 bis(4'-fluorobenzoyl) benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl) benzene (1,4-BHBB). 1,4-BHBB and 1,3-bis(4'-hydroxybenzoyl) benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety).

The 1,4-BHBB used in Comparative Example 2, below, was purified using the procedure of U.S. Pat. No. 5,250,738 to yield a "high-metal monomer," referred to below as "Monomer A."

The 1,4-BHBB used in Comparative Example 3 and Examples 4 and 5 below was purified by recrystallization in DMF/ethanol to yield a ("low-metal monomer") designated "Monomer B." The amount of various metals in the 1,4-BHBB monomers was determined by the ICP-OES analysis described below. Results of the analysis are shown in Table 1:

TABLE 1

| Metals Analysis of 1,4-BHBB Monomer | | |
|---|---|---|
| | Monomer A | Monomer B |
| GC purity (area %) | 100.0 | 100.0 |
| [Al] (wt · ppm) | 1.7 | <1.2 |
| [Fe] (wt · ppm) | 22 | 3.9 |
| [Na] (wt · ppm) | 86 | 1.6 |
| [K] (wt · ppm) | 2.8 | <0.8 |
| [Ca] (wt · ppm) | 33 | 2.2 |
| Total [metals] in monomer (wt · ppm) | 146 | 9.7 |

Comparative Example 1: PEKK Made by an Electrophilic Process

Polycondensation

In a 2000 mL 4-neck reaction flask fitted with a stirrer, a dry $N_2$ inlet tube, a thermocouple plunging in the reaction medium, and a condenser were introduced 1000 g 1,2-dichlorobenzene and 40.63 g 1,4-Bis(4-phenoxybenzoyl) benzene. Under a sweep of dry nitrogen, 7.539 g of terephthaloyl chloride, 9.716 g of isophthaloyl chloride and 0.238 g of benzoyl chloride were then added to the reaction mixture. The reactor was then cooled to −5° C. and 71.88 g of aluminum chloride ($AlCl_3$) were added slowly while keeping the temperature below 5° C. The reaction was held at 5° C. for 10 minutes then the temperature of the mixture was increased to 90° C. at 5° C./minute. The reaction mixture was held at 90° C. for 30 minutes then cooled down to 30° C. At 30° C., 250 g of methanol were added slowly to maintain the temperature below 60° C. After the end of the addition, the reaction mixture was kept under agitation for 2 hours then cooled down to 30° C.

Filtration and Washing

The solid was then removed by filtration on a Büchner. The wet cake was rinsed on the filter with an additional 188 g of methanol. The wet cake was then reslurried in a beaker with 440 g of methanol for 2 hours. The polymer solid was filtered again on Buchner funnel and the wet cake was rinsed on the filter with 188 g of methanol. The solid was slurried with 470 g of an aqueous hydrochloric acid solution (3.5 wt %) for 2 hours. The solid was then removed by filtration on a Buchner. The wet cake was rinsed on the filter with an additional 280 g of water. The wet cake was then reslurried in a beaker with 250 g of 0.5N sodium hydroxide aqueous solution for 2 hours. The wet cake was then reslurried in a beaker with 475 g of water and filtered on Büchner funnel. The last water washing step was repeated 3 more times. The polymer is then slurried with 0.75 g of an aqueous solution containing 6.6 wt % of $NaH_2PO_4 \cdot 2H_2O$ and 3.3 wt % of $Na_2HPO_4$ then dried in a vacuum oven at 180° C. for 12 hours.

Comparative Example 2: Synthesis of PEKK Using Monomer A

The 1,4-BHBB used in this example was Monomer A with a total metal concentration of 146 ppm.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.50 g of diphenyl sulfone, 26.130 g of 1,3-BHBB, 18.921 g of 1,4-BHBB (Monomer A) and 46.525 g of 1,4-DFDK. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 270° C. At 270° C., 15.555 g of $Na_2CO_3$ and 0.098 g of $K_2CO_3$ was added via a powder dispenser to the reaction mixture over 60 minutes. At the end of the addition, the reaction mixture was heated to 320° C. at 1° C./minute. After 14 minutes at 320° C., 1.368 g of 1,4-DFDK were added to the reaction mixture while keeping a nitrogen purge on the reactor. After 5 minutes, 0.600 g of lithium chloride were added to the reaction mixture. 10 minutes later, another 0.456 g of 1,4-DFDK were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 72 g of an yellow powder.

The final PEKK polymer had a T/I ratio of 71/29.

Comparative Example 3: Preparation of PEKK According to Chinese Patent Application No. CN1974631 Using Monomer B In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 249.93 g of diphenyl sulfone, 39.790 g of 1,4-BHBB (Monomer B), 17.726 g of 1,4-DFDK, 22.561 g of 1,3-DFDK and 13.646 g of $Na_2CO_3$. The flask content was evacuated under vacuum and then filled with high purity nitrogen (containing less than 10 ppm O2). The reaction mixture was then placed under a constant nitrogen purge (60 mL/min).

The reaction mixture was heated to 120° C., then from 120° C. to 160° C. at 2° C./min. The mixture was then held at 160° C. for 1 h, heated up to 210° C. at 5° C./min and held at 210° C. for 1 h. The mixture was then heated to 250° C. at 5° C./min and held at 250° C. for 1 h. The mixture was then heated to 290° C. at 10° C./min and held at 290° C. for 2 h. The mixture was heated to 310° C. at 10° C./min and held at 310° C. for 3 h. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 68 g of an off-white/yellow powder.

The final polymer had a T/I ratio of 70/30.

Example 4: First Synthesis of PEKK Using Monomer B

The procedure of Comparative Example 2 was followed, except that the 1,4-BHBB monomer was Monomer B, with a total metal concentration of 9.7 ppm.

The final polymer had a T/I ratio of 71/29.

Example 5: Second Synthesis of PEKK Using Monomer B

The procedure of Example 4 was followed, except that the weight amount of $NaH_2PO_4 \cdot 2H_2O$ and $Na_2HPO_4$ was doubled to 1.34 g and 1.24 g, respectively.

The final polymer had a T/I ratio of 71/29.

Comparative Example 6: Preparation of PEKK According to CN1974631 but Using the Same Monomers as for Examples According to the Invention In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 219.94 g of diphenyl sulfone, 14.706 g of 1,4-bis(4'-hydroxybenzoyl) benzene (14BHBB B, clean), 35.453 g of 1,4-bis(4'-fluorobenzoyl) benzene, 20.309 g of 1,3-bis(4'-hydroxybenzoyl) benzene and 12.009 g of $Na_2CO_3$. The flask content was evacuated under vacuum and then filled with high purity nitrogen (containing less than 10 ppm O2). The reaction mixture was then placed under a constant nitrogen purge (60 mL/min).

The reaction mixture was heated to 120° C., then from 120° C. to 160° C. at 2° C./min. The mixture was then held at 160° C. for 1 h, heated up to 210° C. at 5° C./min and held at 210° C. for 1 h. The mixture was then heated up to 250° C. at 5° C./min and held at 250° C. for 1 h. The mixture was then heated up to 290° C. at 10° C./min and held at 290° C. for 2 h. The mixture was heated up to 310° C. at 10° C./min and held at 310° C. for 26 minutes in order to target a molecular weight in line with other examples. The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 mL DI water for the last wash. The powder was then removed from the reactor and dried at 120° C. under vacuum for 12 hours yielding 60 g of an off-white/yellow powder.

The final polymer had a T/I ratio of 71/29.

Comparative Example 7: Synthesis and Analysis of PEKK Using Monomer with High Levels of Residual Metals and with Low $Na_2CO_3$ The 1,4-BHBB used in this example was Monomer A with a total metal concentration of 146 ppm.

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone, 23.056 g of 1,3-BHBB, 16.695 g of 1,4-BHBB and 41.051 g of 1,4-DFDK. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 260° C. At 260° C., 13.566 g of $Na_2CO_3$ and 0.086 g of $K_2CO_3$ was added via a powder dispenser to the reaction mixture over 60 minutes. At the end of the addition, the reaction mixture was heated to 320° C. at 1° C./minute. After 14 minutes at 320° C., 1.409 g of 1,4-DFDK were added to the reaction mixture while keeping a nitrogen purge on the reactor. After 5 minutes, 0.529 g of lithium chloride were added to the reaction mixture. 10 minutes later, another 0.402 g of 1,4-DFDK were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 2.03 g of $NaH2PO4 \cdot 2H2O$ and 1.86 g of $Na_2HPO_4$ were dissolved in 1200 ml DI water for the last wash. The powder was then removed from the reactor and dried at 120° C. under vacuum for 12 hours yielding 72 g of a yellow powder.

The final PEKK polymer had a T/I ratio of 71/29.

TABLE 2

| | Analysis of PEKK Polymers | | | | | | |
|---|---|---|---|---|---|---|---|
| Example | CE1 | CE2 | CE3 | CE 6 (60054-80) | CE7 (2018-17-E1) | E4 | E5 |
| Σ | N/A | 0.9 | 7.0 | 7.2 | −0.3 | 0.9 | 0.9 |
| 1,4-BHBB Source | N/A | Monomer A | Monomer B | Monomer B | Monomer A | Monomer B | Monomer B |
| [Al] (wt.ppm) | 69 | 0.5 | 4.2 | 0.7 | <0.4 | 0.3 | <0.5 |
| [Ca] (wt.ppm) | 60 | 0.8 | 7.0 | 2.5 | <0.4 | 0.5 | 0.9 |
| [Na] (wt.ppm) | 375 | 129 | 407 | 62 | 362 | 167 | 589 |
| [Fe] (wt.ppm) | 14.3 | 19 | 15 | 21 | 1.6 | 2.9 | 1.6 |
| MFI (360° C., 8.4 kg) | 82 | 81 | 0.11 | 45 | 343 | 75 | 88 |
| VR40 (410° C.) | 1.33 | 1.54 | 5.04 | 61 | 87 | — | 1.24 |
| Complex viscosity parallel plates (10 minutes) (Pa-s) | 210 | 304 | — | 70 | 86 | 175 | 184 |
| G' (10 minutes) (Pa) | 817 | 745 | — | 21 | 24 | 280 | 247 |
| G" (10 minutes) (Pa) | 1929 | 2952 | — | — | — | 1729 | 1828 |
| Complex viscosity parallel plates (120 minutes) (Pa-s) | 1309 | 1183 | — | 461 | 322 | 409 | 354 |
| G' (120 minutes) (Pa) | 10739 | 8587 | — | 1044 | 1031 | 1730 | 1436 |
| G" (120 minutes) (Pa) | 7489 | 8142 | — | 4490 | 3052 | 3708 | 3237 |

TABLE 2-continued

Analysis of PEKK Polymers

| Example | CE1 | CE2 | CE3 | CE 6 (60054-80) | CE7 (2018-17-E1) | E4 | E5 |
|---|---|---|---|---|---|---|---|
| Complex viscosity ratio 120/10 parallel plates | 6.2 | 3.89 | — | 6452 | 1934 | 2.34 | 1.92 |
| Time to crossover G'-G" (minutes) | 53 | 113 | — | 57360 | 16807 | >120 | >120 |

As shown above, the PEKK of Examples 4 and 5 surprisingly exhibited improved melt stability (see, e.g. VR40 and complex viscosity ratio 120/10) as compared with Comparative Example 1 made using an electrophilic process.

Furthermore the PEKK of Examples 4 and 5 (Σ=0.9 and low-metal Monomer B), unexpectedly exhibited improved melt stability (see, e.g. VR40 and complex viscosity ratio 120/10) as compared with Comparative Example 2 (Σ=0.9 and high-metal Monomer A), even though the PEKK of Comparative Example 2 had a relatively low level of metals. In this regard, the complex viscosity profile by parallel plates over time of the PEKK polymers of Comparative Example 2 and Example 5 is shown in the FIGURE. The FIGURE further demonstrates the unexpectedly enhanced stability over time of the PEKK of Example 5 as compared with the PEKK of Comparative Example 2.

In addition, the PEKK of inventive Example 5 with amounts of reactants meeting the requirement, Σ<6.0 surprisingly exhibited significantly improved melt stability (VR40) as compared with the PEKK of Comparative Example 3 where the amount of reactants did not meet the requirement, Σ<6.0.

Finally, the time at which the shear storage modulus (G') and shear loss modulus (G") intersect (the "crossover time"), i.e. the time it takes for the polymer to start behaving more like solid than a liquid at 410° C., is also recorded and indicates that the PEKK of Examples 4 and 5 unexpectedly did not crosslink under the test conditions to the extent of the PEKK of Comparative Examples 1 and 2.

Impact Strength Test

The PEKK polymer of Comparative Example 1 (CE1) and the PEKK polymer of Example 5 were converted into a continuous carbon fiber unitape prepreg through a melt impregnation process.

The unitape prepregs had a nominal resin content of 34 wt. % and a fiber areal weight of 145 g/m². The prepreg tape was cut and laid up into a 32 ply quasi-isotropic lay-up ([+45/90/−45/0]4s) (350 mm×350 mm panel size) in preparation for autoclave consolidation.

The lay-ups were vacuum bagged using high temperature polyimide film for the bagging film. A straight ramp consolidation autoclave cycle was employed which used 685-760 mm Hg vacuum on the lay-up at the start of the cycle and then heated to the consolidation temperature with a heating rate of 3-7° C./minute. Once the maximum consolidation temperature is reached, 6.8 bars of pressure were applied and held for the specified period of time before being cooled. The cool down rate which is also done under the same vacuum level is 3-5° C./minute. The test panels were removed from the autoclave and then ultrasonic scanned to ensure good consolidation (less than 2% void content) before machining the laminates into test coupons for compression after impact testing.

The compression after impact test method used was ASTM D7137 using an impact energy level of 6.7 J/mm.

Five test coupons were tested for each of CE1 and Example 5. The results, as compression after impact (CAI) strength results for both polymers, were measured at different autoclave hold times at maximum temperature and are showed in following Table 3.

TABLE 3

| Example | Unit | 20 min. @375° C. | 70 min. @375° C. | 240 min @390° C. |
|---|---|---|---|---|
| 5 | MPa | 248 | 269 | 283 ± 11.4 |
| CE1(*) | MPa | 276 | 263 | 263 ± 10.7 |

(*)comparison

Polymer of Example 5 with lower impurities increased in toughness by 14% as opposed to the polymer of Comparative Example 1, for which a limited amount of washing to reduce impurities showed a reduction of 5%.

The invention claimed is:

1. A poly(ether ketone ketone) polymer [PEKK$_S$ polymer] comprising
at least one recurring unit ($R^{M*}_{PEKK}$) of general formula -[M$_m$-O—]-; and
at least one recurring unit ($R^{P*}_{PEKK}$) of general formula -[M$_p$-O—]-;
M$_m$ and M$_p$ are represented by the following formulae, respectively:

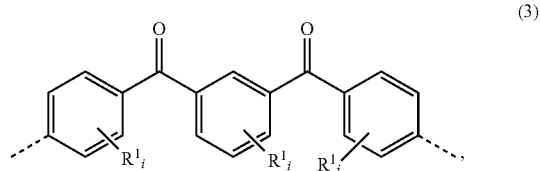

(3)

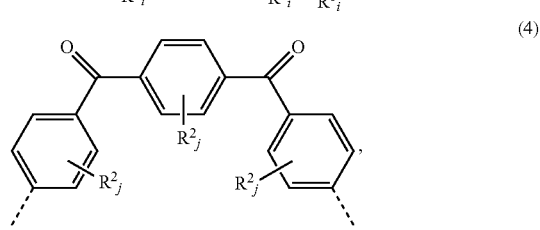

(4)

wherein
- each of R1 and R2 is independently selected from the group consisting of alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
- each of i and j is independently selected from 0 or an integer from 1 to 4;
- said $PEKK_S$ polymer being characterized by % [F]>45 (μeq/g)/(g/10 min)$^{0.29}$ and
- T/I ratio greater than 61/39,
- wherein
  - % [F] is the ratio between [F], i.e. the concentration of fluorine end groups in the PEKK polymer measured by $^{19}$F-NMR, and MFI, i.e. the melt flow index of the $PEKK_S$ polymer determined according to ASTM D1238 at 360° C. with a 8.4 Kg weight to the 0.29 power, and
  - T/I ratio is the ratio between recurring units ($R^{P*}_{PEKK}$) and recurring units ($R^{M*}_{PEKK}$).

2. The $PEKK_S$ polymer according to claim 1, wherein the T/I ratio is of at least 65/35 and/or wherein the % [F] is higher than 50 (μeq/g)/(g/10 min)$^{0.29}$.

3. The $PEKK_S$ polymer according to claim 1, wherein said $PEKK_S$ polymer has a phosphorus level of at least 30 ppm as measured by ICP-OES.

4. A composite obtained by method ($M_C$) of making a composite comprising a polymer matrix including a poly(ether ketone ketone) polymer [$PEKK_C$ polymer], said method comprising the following steps:
- (I*) preparing a poly(ether ketone ketone) ($PEKK_C$) polymer by reacting, in a reaction mixture, at least one low-metal bis(hydroxybenzoyl) benzene monomer [monomer (HB)] and at least one low-metal bis(halobenzoyl) benzene monomer [monomer (FB)] in the presence of $Na_2CO_3$, $K_2CO_3$ and a solvent,
- wherein the relative amounts of the components reactants in step (I) are selected according the following Formulae:

$$\Sigma = (\% \ Na_2CO_3 - 105) + 6*|\% \ K_2CO_3 - 1| + 0.25*|37 - \% \ \text{Monomers}| - (\% \ XS_{DFDK}) \quad (EQ1)$$

and $$0\% \leq K_2CO_3 < 5 \text{ and} \quad (EQ2)$$

$$0\% < \% \ XS_{DFDK} \text{ and} \quad (EQ3)$$

$$25\% \leq \text{Monomers} \leq 44\% \text{ and} \quad (EQ4)$$

wherein
- (a) $\Sigma < 6$
- (b) % $Na_2CO_3$ is the concentration, in mol. %, of $Na_2CO_3$ relative to the number of moles of said monomer (HB);
- (c) % $K_2CO_3$ is the concentration, in mol. %, of $K_2CO_3$ relative to the number of moles of said monomer (HB) and where % $K_2CO_3$ ranges from 0 mol. % to less than 5 mol. %;
- (d) % Monomers is the total concentration, in wt. %, of said monomer (HB) and said monomer (FB), relative to the weight of said monomer (HB), of said monomer (FB) and solvent, and where % Monomers is from 25 wt. % to 44 wt. %; and
- (e) % $XS_{DFDK}$ is the concentration, in mol. %, of said monomer (FB) in excess of an equimolar concentration of said monomer (HB);
- said monomer (HB) and said monomer (FB) being independently represented by one of the following formulae:

$$X^5 - M_m - X^5 \quad (13)$$

$$X^6 - M_p - X^6 \quad (14)$$

wherein
- $X^5$ and $X^6$ are —OH for said monomers (HB) and halogen for said monomers (FB), and
- $M_m$ and $M_p$ are represented by the following formulae, respectively:

wherein
- each of R1 and R2 is independently selected from the group consisting of
- alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
- each of i and j is independently selected from 0 or an integer from 1 to 4;
- to provide a polymer matrix comprising at least one $PEKK_C$ polymer comprising
  - at least one recurring unit ($R^{M*}_{PEKK}$) of general formula -[$M_m$-O—]-; and
  - at least one recurring unit ($R^{P*}_{PEKK}$) of general formula -[$M_p$-O—]-;
- wherein $M_m$ and $M_p$ are represented above formulae (3) and (4), respectively; and
- (II*) impregnating reinforcing fibers with the polymer matrix as obtained in step (I*) above, to form a composite.

5. A composite [composite (C)] comprising reinforcing fibers in said polymer matrix comprising at least one $PEKK_C$ polymer as defined in claim 4, wherein said at least one $PEKK_C$ polymer is characterized by a complex viscosity ratio 120/10 (parallel plates) as measured according to ASTM D4440 at 410° C., under nitrogen, 10 rad/s, 1% strain at 10 and 120 minutes, ranging from 1.0 to 3.5.

6. A composite article comprising the composite as defined in claim 4, said composite comprising at least one portion having a thickness of at least 4 mm.

7. A composite [composite ($C_S$)] comprising at least one $PEKK_S$ polymer as defined in claim 1 and at least one reinforcing fiber.

8. The composite ($C_S$) of claim 7, said composite comprising from 20 to 80 wt. % of reinforcing fibers and from 80 to 20 wt. % of said $PEKK_S$ polymer, based on the weight of the PEKK composite.

9. The $PEKK_S$ polymer according to claim 1, wherein the T/I ratio is of at least 68/32 and/or wherein the % [F] is higher than 60 (μeq/g)/(g/10 min)$^{0.29}$.

10. The $PEKK_S$ polymer according to claim 1, wherein said $PEKK_S$ polymer has a phosphorus level of at least 40 ppm as measured by ICP-OES.

11. The $PEKK_S$ polymer according to claim 1, wherein said $PEKK_S$ polymer has a phosphorus level of at least 60 ppm as measured by ICP-OES.

12. The composite according to claim 4, wherein $X^5$ and $X^6$ are Cl or F for monomers (FB).

13. The composite according to claim 4, wherein $X^5$ and $X^6$ are F for monomers (FB).

14. The composite ($C_S$) according to claim 7, wherein the at least one reinforcing fiber is selected from glass fibers or carbon fibers.

\* \* \* \* \*